(12) United States Patent
Schindler et al.

(10) Patent No.: US 7,068,625 B1
(45) Date of Patent: Jun. 27, 2006

(54) METHOD FOR SWITCHING A COMMUNICATIONS LINK TO ANOTHER CHANNEL (HANDOVER)

(75) Inventors: Juergen Schindler, Berlin (DE); Egon Schulz, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/889,179

(22) PCT Filed: Jan. 10, 2000

(86) PCT No.: PCT/DE00/00063

§ 371 (c)(1),
(2), (4) Date: Jul. 12, 2001

(87) PCT Pub. No.: WO00/42802

PCT Pub. Date: Jul. 20, 2000

(30) Foreign Application Priority Data

Jan. 13, 1999  (DE) .............................. 199 01 004

(51) Int. Cl.
*H04Q 7/00*  (2006.01)
(52) U.S. Cl. ........................ 370/331; 370/336; 455/436
(58) Field of Classification Search ..................... None
See application file for complete search history.

(56) References Cited

U.S. PATENT DOCUMENTS

| | | | | |
|---|---|---|---|---|
| 5,182,753 A | * | 1/1993 | Dahlin et al. ................ | 714/749 |
| 5,293,380 A | * | 3/1994 | Kondo ......................... | 370/337 |
| 5,327,576 A | * | 7/1994 | Uddenfeldt et al. ......... | 370/333 |
| 5,483,668 A | * | 1/1996 | Malkamaki et al. ......... | 455/442 |
| 5,524,009 A | | 6/1996 | Tuutijarvi et al. | |
| 5,590,133 A | * | 12/1996 | Billstrom et al. ........... | 370/349 |
| 5,648,967 A | * | 7/1997 | Schulz ........................ | 370/328 |
| 5,870,675 A | | 2/1999 | Tuutijarvi et al. | |
| 5,898,730 A | * | 4/1999 | Hensley et al. ............. | 375/224 |
| 5,940,381 A | * | 8/1999 | Freeburg et al. ............ | 370/331 |
| 5,974,035 A | * | 10/1999 | Norp .......................... | 370/331 |
| 6,092,222 A | * | 7/2000 | Jolma et al. ................ | 714/786 |

FOREIGN PATENT DOCUMENTS

| | | |
|---|---|---|
| WO | WO 97/31499 | 8/1997 |
| WO | WO 99/29133 | 6/1999 |

* cited by examiner

*Primary Examiner*—Bob A. Phunkulh
(74) *Attorney, Agent, or Firm*—Morrison & Foerster LLP

(57) ABSTRACT

The invention relates to a method for switching a communications link to another channel (handover) in a digital cellular mobile radio systems and a mobile radio system, the time of the handover being determined by a decision algorithm. Roughly generalized, the changeover to a new channel can take place between two radio systems or frequency bands within a radio system (external handover), between two radio cells within a cellular network (intercell handover) or within a radio cell (intracell handover). Each handover case, in turn, can include various type of handover.

11 Claims, 3 Drawing Sheets

METHOD FOR SWITCHING A COMMUNICATIONS LINK TO ANOTHER CHANNEL (HANDOVER)

CLAIM FOR PRIORITY

This application claims priority to International Application No. PCT/DE00/00063 which was published in the German language on Jul. 20, 2000.

TECHNICAL FIELD OF THE INVENTION

The invention relates to a method for switching a communications link to another channel (handover), and in particular, to a method in digital cellular mobile radio systems and a mobile radio system.

The invention relates to a method for switching a communications link to another channel (handover) in digital cellular mobile radio systems and a mobile radio system, the time of the handover being determined by a decision algorithm. Roughly generalized, the changeover to a new channel can take place between two radio systems or frequency bands within a radio system (external handover), between two radio cells within a cellular network (intercell handover) or within a radio cell (intracell handover). Each handover case, in turn, can include various type of handover.

BACKGROUND OF THE INVENTION

The beginning of mobile telecommunication was dominated by a multiplicity of different incompatible systems and mobile radio networks which in most cases were set up along national and proprietary lines. Out of this situation, the definition of pan-European standards was begun during the changeover to the fully digital transmission of voice and signaling, among which standards DECT (Digital European Cordless Telephone), on the one hand, and GSM (Global System for Mobile Communications) and UMTS (Universal Mobile Telecommunication Service), on the other hand, will be compared in greater detail in the text below.

In principle, in the systems mentioned, the data to be transmitted are split into units, so-called voice or data frames, which are transmitted in succession. The size of these frames, and thus the quantity of data contained in them, and the treatment of the data within the frames for the purpose of increasing the data throughput and the data security (e.g. interleaving) are defined in the individual standards.

The DECT standard is used for supporting personal quasi-static communication services and is called cordless ISDN because of its characteristics. Due to a seamless handover, DECT is particularly well suited to dense traffic. The seamless handover in the DECT system is essentially based on the fact that a 32-kbit/s ADPCM (Adaptive Delta Pulse Code Modulation) speech codec is used which continuously supplies data. The speech frames in the ADPCM speech codec correspond to speech having the duration of one sample. At a sampling rate of, for example, 8 kHz, one frame thus corresponds to a period of 125 µs. Furthermore, the coded speech frames are not transmitted interleaved over a number of time slots.

GSM is the first digital cellular mobile radio standard which, with international roaming and ISDN capability, offers international mobility, a high data security and a great variety of data. Continuing on from this, the existing standards lead to the pan-European universal mobile radio standard UMTS. In the future UMTS standard, two modes are proposed, which are FDD (Frequency Division Duplex) and TDD (Time Division Duplex). In the FDD mode, a transmission channel is characterized by the degrees of freedom of frequency and spread-spectrum code. This is a CDMA (Code Division Multiple Access) system. The principle of CDMA consists in distinguishing between mobile radio subscribers not only by means of different frequencies but also sequences of codes. In the TDD mode, a transmission channel is defined by the degrees of freedom, frequency, time slot and spread-spectrum code. The UMTS TDD mode is called a TD/CDMA system.

In the GSM standard or in the UMTS system, too, speech codecs are used which in each case process voice or data frames having a fixed length of 20 ms. In the GSM standard or also in the TDD mode of the UMTS system, these frames are transmitted by means of the TDMA (Time Division Multiple Access) method in which the voice and data frames are transmitted distributed over a number of time slots which are produced by dividing a carrier frequency over a number of mobile stations. With a time slot period of 10 ms in the TDD mode, a voice or data frame is transmitted in two successive TDMA frames. In TDD mode, 16 time slots are provided in one TDMA frame. To be able to correct, on the one hand, random bit errors and, on the other hand, burst errors of the mobile radio channel, redundancies are added to the data to be transmitted for protecting against errors. In addition, the data are transmitted interleaved in two blocks in order to achieve further improvement with respect to disturbances such as, for example, fading. When there is interleaving, the data are not forwarded in the same order but a new temporal sorting is created which, naturally, is cancelled again at the receiving end.

In the FDD mode (CDMA), too, the data are transmitted in interleaved blocks.

The cellular structure of the entire coverage area demands that a seamless handover of a mobile station from the previous coverage area to another coverage area is established if the latter promises better transmission quality. The handover is a very critical process with respect to timing since the continuity of current calls must be ensured. It has a significant influence on the capacity and the performance of cellular networks and includes the following three phases: measurement, handover initiation, switchover to the destination base station. The continuous measurements have the purpose of detecting whether a handover is necessary. A handover algorithm makes the decision whether and when a change of transmission channel is required or appropriate dependent on various criteria such as received power, bit error rates, signal/noise ratios and distance from the current base station.

Once the handover algorithm has made a handover decision, the necessary preparations are made in the network and, in particular, the landline connection from the mobile switching center to the new base station is switched through and a new suitable transmission channel is selected. Further actions with respect to subscriber and mobility administration can be added before the final handover takes place in a third phase without regard to the interleaving of the transmission data. It is thus possible that the complete voice frame has not been received on the old transmission channel and only part of the first voice frame is received on the new transmission channel, for example only the second block of the voice frame in the UMTS TDD mode. In the worst case, a bit error rate of at least 50% arises for both voice frames due to the interleaving, with the result that repair becomes impossible even by inserted redundancies. Two successive voice frames are thus unusable, as a result of which the quality of the voice link drops since at least 40 ms of speech are missing. This loss is clearly noticeable.

The same problems occur during the transmission of packet data in packet mode or during the transmission of data with large interleaving depths. If a self-contained data packet is not completely transmitted due to a handover, important information of a larger file, which is contained in it, is lost.

SUMMARY OF THE INVENTION

In one embodiment of the invention, there is a method for switching a communications link to another channel (handover) within or between mobile radio systems. The method includes splitting data to be transmitted into frames of identical length and interleaved; and determining a time of handover using a decision algorithm, wherein the handover occurs after a complete frame has been transmitted.

In one aspect of the invention, the handover is carried out at least partially based on the interleaving depth.

In another aspect of the invention, the time of handover is determined by a network on the basis of the knowledge of the interleaving of the transmitted data.

In yet another aspect of the invention, the time of handover is determined by a mobile station on the basis of the knowledge of the interleaving of the transmitted data.

In still another aspect of the invention, during data transmissions in TDMA systems, handover occurs after transmission of a TDMA frame with a TDMA frame number wherein (TDMA frame number−starting TDMA frame number+1) modulo interleaving depth=0.

BRIEF DESCRIPTION OF THE INVENTION

The invention and its advantages will be explained in greater detail with reference to an exemplary embodiment, associated with the drawings, in which.

DETAILED DESCRIPTION OF THE PREFERRED EMBODIMENTS

Figure 1:
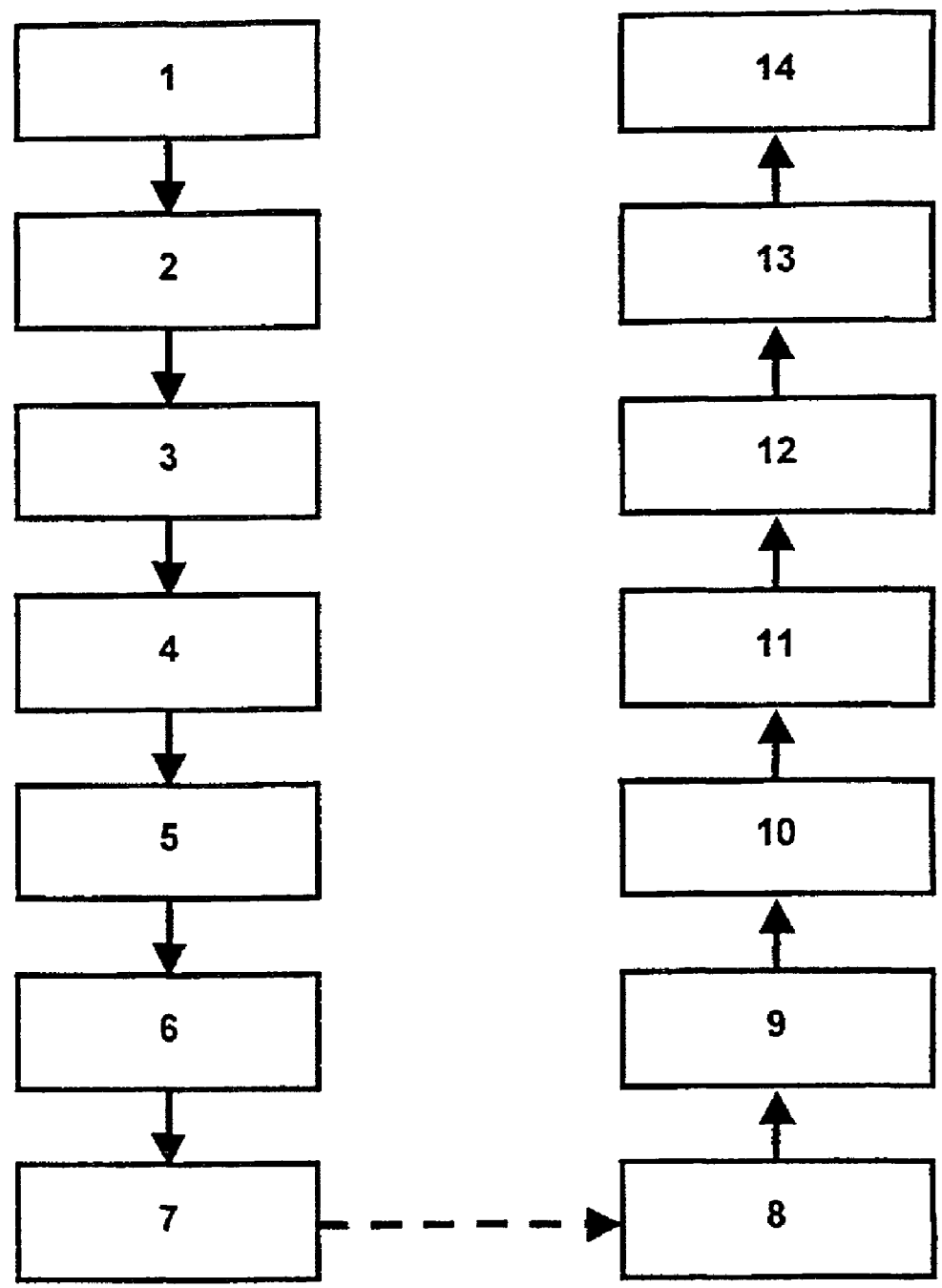
FIG. 1 shows a reference model of voice transmission in digital mobile radio.

The invention relates to a method for switching a communications link to another channel (handover), and in particular, to a method in digital cellular mobile radio systems and a mobile radio system, the time of the handover being determined by a decision algorithm. The changeover to a new channel can take place between two radio systems or frequency bands within a radio system (external handover), between two radio cells within a cellular network (intercell handover) or within a radio cell (intracell handover). Each handover case, in turn, can include various type of handover.

In one embodiment of the invention, the disturbances described above are reduced, increased by the interleaving of the data, during handover.

A handover according to the invention is performed after the transmission of a complete voice or data frame, taking into consideration the interleaving depth, as a result of which the data losses in the currently used handover methods as described above are reliably prevented. Handover is understood to be not only the intracell handover or the handover between two cells of a cellular network but also the handover from one system to another system such as, for example, from UMTS TDD to UMTS FDD or to GSM or internally in the case of a handover from one frequency to another frequency.

The time of the handover is determined by a device which is implemented in the network and/or in the mobile station. It is additionally determined on the basis of the knowledge of the interleaving of the transmission data.

In the case of data transmissions (voice, fax, modem) in TDMA systems, handover takes place after transmission of a TDMA frame having a TDMA frame number that meets the condition:

(TDMA frame number−starting TDMA frame number+1) modulo interleaving depth=0.

In the case of voice links, this means that the first block of the voice frame is transmitted in an odd-numbered TDMA frame and the second block of the voice frame is transmitted in an even-numbered TDMA frame and the handover is thus performed after an even-numbered TDMA frame has been transmitted.

In the case of a transmission of a voice frame over n (n=integral, even-numbered) time slots, however, the first data block of the voice frame can also be transmitted in an even-numbered TDMA frame and the second data block of the voice frame can be transmitted in an odd-numbered TDMA frame and the handover can thus be performed exclusively after an odd-numbered TDMA frame has been transmitted.

The interleaving depth to be taken into consideration for a handover can be marked by flags in an advantageous further development, where a separate flag can be allocated, for example, to each service (voice service, data services). The mobile station receives this information via the control channel for transmitting general data ($CCH(D_m)$), and especially via the logical broadcast control channel (BCCH), a common control channel (CCCH) associated with a traffic channel (TCH) or by inband signaling in the dedicated control channel (DCCH).

In an analogous application, the method can also be applied to the transmission of packet data by performing a handover when a packet data unit (PDU) or a self-contained packet has been completely transmitted.

The diagrammatic reference model for voice transmission in a digital mobile radio network, shown in FIG. 1, shows individual processing from the voice input to the reproduction. Initially, voice 1 is digitized at 2, channel coding takes place at 3, interleaving takes place at 4, burst formatting takes place at 5, encryption takes place at 6 and at 7 the binary data are modulated onto the carrier signal. After the data have been transmitted to a receiver via a radio interface, demodulation takes place at 8, the data are decrypted at 9, the burst information from 5 is analyzed at 10, the interleaved data are sorted into the correct output order at 11, channel decoding takes place at 12 and, finally, at 13 the digital signals are converted into the transmitted voice information 14.

Figure 2:
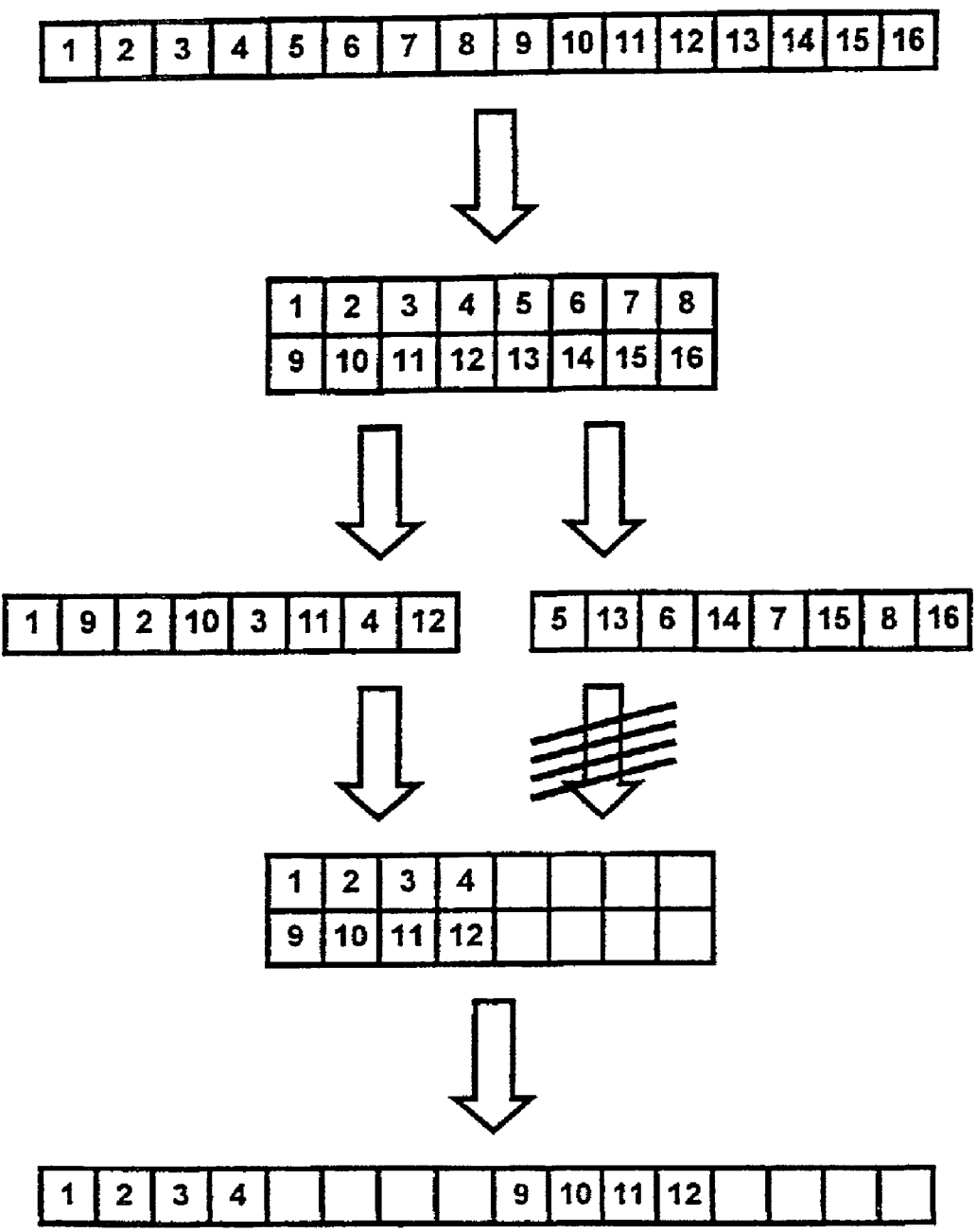
FIG. 2 shows a section according to the reference model of FIG. 1, including exemplary values of a transmission during a handover in accordance with the prior art.

FIG. 2 shows, by way of example, a voice frame 15 as provided after the channel coding at 3. The voice frame 15 is split into two TDMA frames 17 by an interleaving matrix 16 which is formed by writing the voice frame 15 in row by row, in such a manner that any bit errors are distributed, thus increasing the possibility of error repair. Assuming handover takes place after the first TDMA frame has been transmitted from 17 so that the second TDMA frame is missing, data losses are produced during the reconstruction of the interleaving matrix at the receiver end 18 from the point at which handover took place and these data losses cannot be repaired in the received data frame 19. This data frame is thus unusable and the information contained in it is lost. Naturally, this also applies to the case where the second TDMA frame is transmitted.

Figure 3:
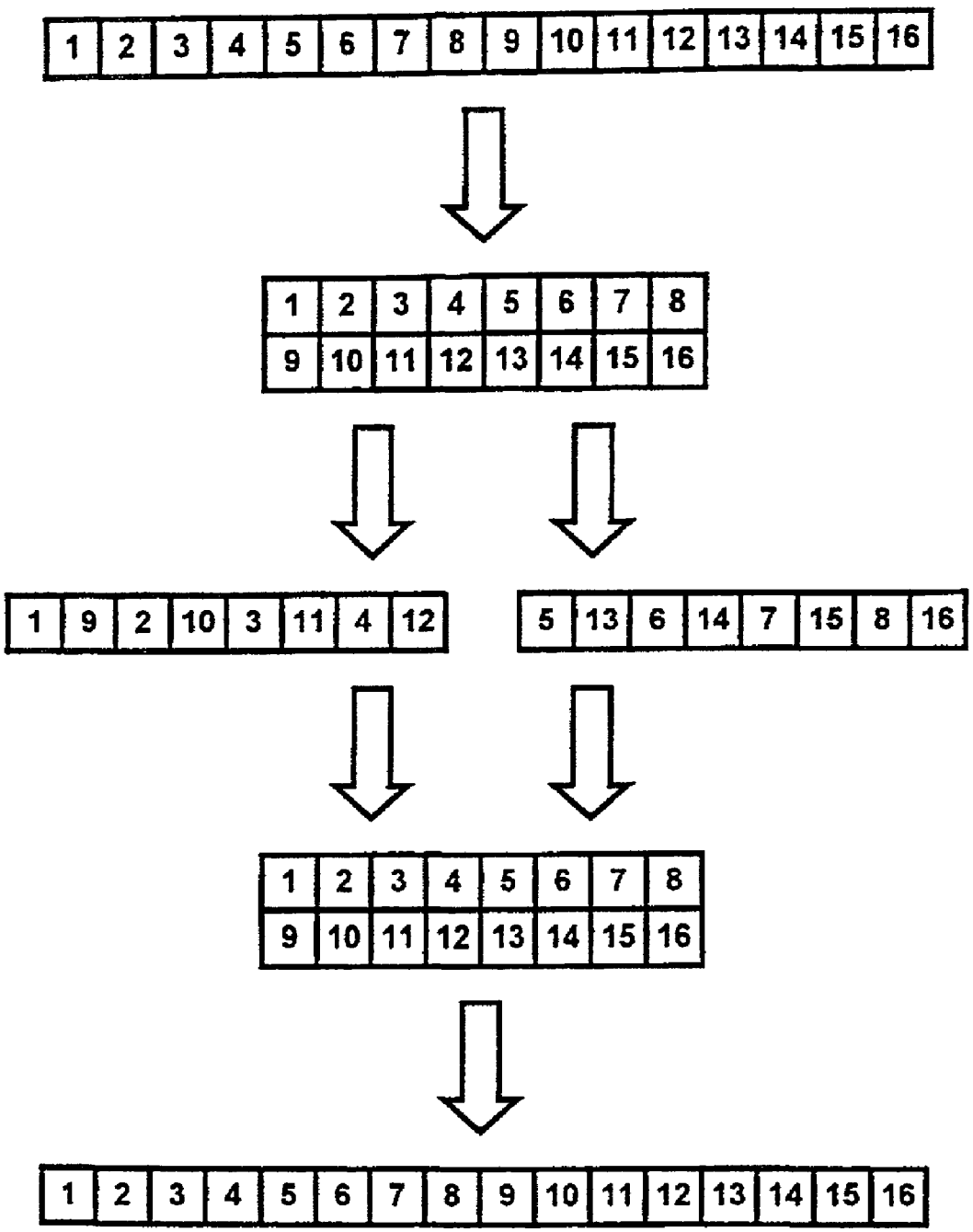
FIG. 3 shows a section according to the reference model of FIG. 1 with exemplary values of a transmission in the case of a handover according to the invention.

According to FIG. 3, handover always takes place after the entire voice frame has been transmitted, thus after both TDMA frames 17 have been transmitted, in the example, so that the data losses shown in FIG. 2 can no longer occur and the received voice frame 18 includes the data in full. Since voice frames always have a particular length and thus there is a net data rate of 160 bits, for example, in the case of 8-kbit/s voice and a period of 20 ms, the end of a voice frame can be easily counted off.

TDMA frames 17 have been transmitted, in the example, so that the data losses shown in FIG. 2 can no longer occur and the received voice frame 18 contains the data in full. Since voice frames always have a particular length and thus there is always a net data rate of 160 bits, for example, in the case of 8-kbit/s voice and a period of 20 ms, the end of a voice frame can be easily counted off.

This equally applies to the end of complete data packets or data segments which are always transmitted in a particular size, e.g. 800 bits in the case of data packets. The size itself, however, can vary depending on the data rate of the packet data service.

The invention can also be used to good effect in the FDD mode of the CDMA system in which the data are also transmitted in interleaved blocks. A handover is appropriately performed only after a complete voice or data frame has been received, and not within a voice or data frame.

What is claimed is:

1. A method for switching a communications link to another channel (handover) within or between mobile radio systems, comprising:
   splitting data to be transmitted into frames of identical length and interleaved; and
   determining a time of handover using a decision algorithm, wherein the handover occurs after a complete frame has been transmitted,
   wherein a flag marks an interleaving depth to be considered in the handover and the handover is carried out at least partially based on the interleaving depth.

2. The method as claimed in claim 1, wherein the time of handover is determined by a network on the basis of the knowledge of the interleaving of the transmitted data.

3. The method as claimed in claim 1, wherein the time of handover is determined by a mobile station on the basis of the knowledge of the interleaving of the transmitted data.

4. The method as claimed in claim 1, wherein the flag is set for respective voice and data services.

5. The method as claimed in claim 1, wherein in the case of transmitted data in CDMA systems, the handover occurs after a complete frame has been transmitted.

6. The method as claimed in claim 1, wherein the frames are voice or data frames.

7. A method for switching a communications link to another channel (handover) within or between mobile radio systems, comprising:
   splitting data to be transmitted into frames of identical length and interleaved; and
   determining a time of handover using a decision algorithm,
   wherein the handover occurs after a complete frame has been transmitted, wherein during data transmissions in TDMA systems, handover occurs after transmission of a TDMA frame with a TDMA frame number wherein (TDMA frame number−starting TDMA frame number+1) modulo interleaving depth=0.

8. A method for switching a communications link to another channel (handover) within or between mobile radio systems, comprising:
   splitting data to be transmitted into frames of identical length and interleaved; and
   determining a time of handover using a decision algorithm,
   wherein in the case of voice links, a first data block of a voice frame is transmitted in an odd-numbered TDMA frame and the second data block of a voice frame is transmitted in an even-numbered TDMA frame and the handover is performed after an even-numbered TDMA frame has been transmitted.

9. A method for switching a communications link to another channel (handover) within or between mobile radio systems, comprising:
   splitting data to be transmitted into frames of identical length and interleaved; and
   determining a time of handover using a decision algorithm,
   wherein in the case of a transmission of a voice or data frame over n time slots, a first block of the voice frame is transmitted in an even-numbered TDMA frame and a second block of the voice or data frame is transmitted in an odd-numbered TDMA frame and the handover is performed after an odd-numbered TDMA frame has been transmitted.

10. A method for switching a communications link to another channel (handover) within or between mobile radio systems with packet access, comprising:
    determining a time of handover using a decision algorithm,
    wherein the handover occurs after a complete segment or a self-contained packet has been transmitted, and
    wherein during data transmissions in TDMA systems, handover occurs after transmission of a TDMA frame with a TDMA frame number wherein (TDMA frame number−starting TDMA frame number+1) modulo interleaving depth=0.

11. A digital cellular mobile radio system having a network and mobile stations, comprising:
    a device to switching a communications link to another channel (handover) which uses a decision algorithm with respect to a time of handover, the handover occurring after a complete voice or data frame has been transmitted,
    wherein during data transmissions in TDMA systems, handover occurs after transmission of a TDMA frame with a TDMA frame number wherein (TDMA frame number−starting TDMA frame number+1) modulo interleaving depth=0.

* * * * *